April 5, 1938.  S. NEWBERY  2,113,490
DISPENSING LIQUIDS AND APPARATUS FOR CONTROLLING THE OPERATION OF A PLANT
Filed Aug. 14, 1934  5 Sheets-Sheet 1

April 5, 1938.  S. NEWBERY  2,113,490
DISPENSING LIQUIDS AND APPARATUS FOR CONTROLLING THE OPERATION OF A PLANT
Filed Aug. 14, 1934  5 Sheets—Sheet 2

S. Newbery
INVENTOR
By: Glascock Downing & Seebold
Attys.

April 5, 1938.   S. NEWBERY   2,113,490
DISPENSING LIQUIDS AND APPARATUS FOR CONTROLLING THE OPERATION OF A PLANT
Filed Aug. 14, 1934   5 Sheets-Sheet 4

S. Newbery
INVENTOR
By: Glascock Downing Seebold
Attys.

Patented Apr. 5, 1938

2,113,490

UNITED STATES PATENT OFFICE 2,113,490

DISPENSING LIQUIDS AND APPARATUS FOR CONTROLLING THE OPERATION OF A PLANT

Stanley Newbery, Peterborough, England

Application August 14, 1934, Serial No. 739,819
In Great Britain August 15, 1933

19 Claims. (Cl. 68—18)

This invention relates to apparatus for controlling the operation of or delivery of measured quantities of a liquid or liquids (or semi-liquids hereinafter referred to as "liquids") to a vessel of a laundry plant or to a mixing or other vessel of chemical or industrial plant.

The object of the invention is broadly to provide an improved apparatus whereby the dispensing of liquid or liquids to a vessel may be controlled automatically both as regards time or sequence of delivery and as to quantity.

An aim of the invention is to provide apparatus for delivering a liquid (such as water) in measured quantities to a vessel (such as a laundry washing drum) at predetermined times automatically by a single control device.

A further object is to provide apparatus for delivering one or more other liquids to the vessel (or drum), to which a main liquid (such as water) is delivered, in predetermined measured quantities and at predetermined times or sequence automatically under the control of a single master device.

While the invention is particularly suitable for application to laundry work for controlling washing operations or dispensing water or other liquids required therein, it may be employed in various arts where the supply of measured quantities of liquids is required at predetermined intervals of time or in respect to the sequence of predetermined operations of a plant.

Further objects and advantages of the invention will be hereinafter more fully described and pointed out in the claims.

Referring to the accompanying drawings:—

Figure 1:
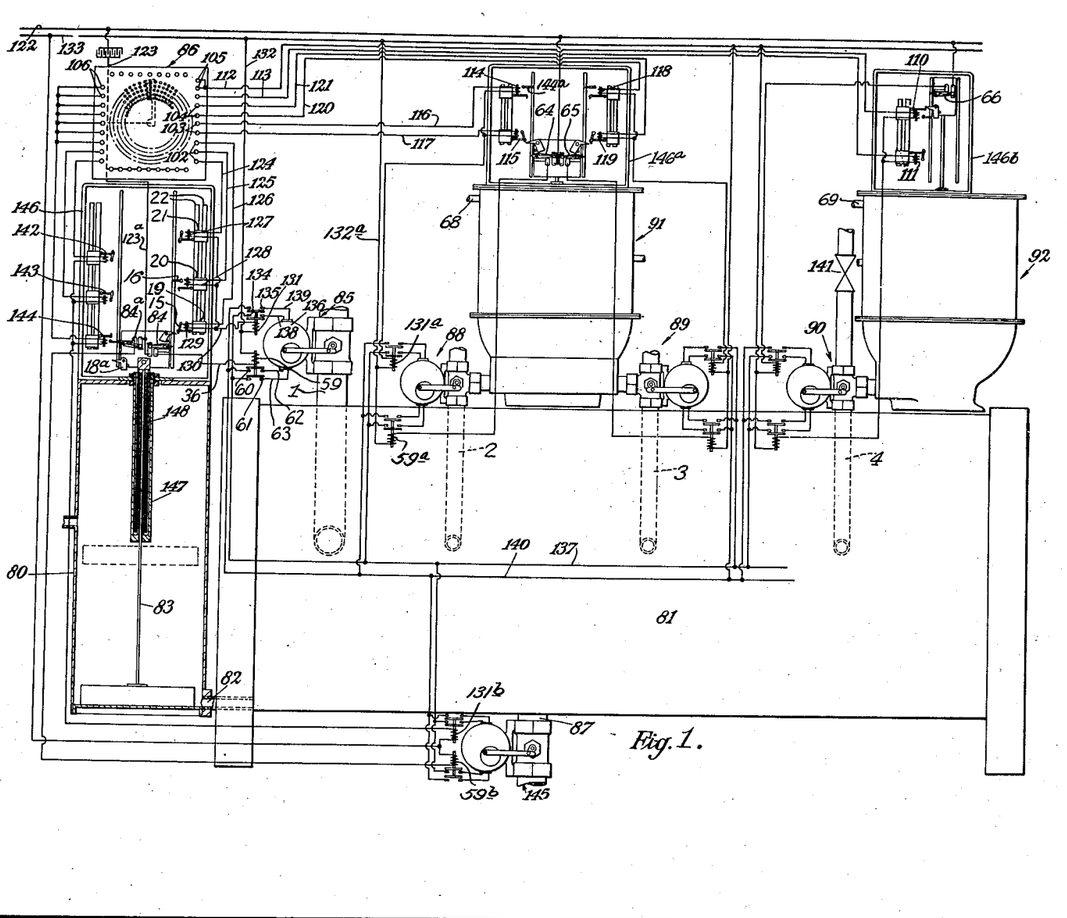
Figure 1 is a diagrammatic representation partly in section of apparatus according to the invention consisting of a washing machine or the like provided with a plurality of liquid dispensing devices controlled by a master switch.

In carrying the invention into effect according to one convenient mode as applied to a laundry washing plant as illustrated in Fig. 1, a common vessel or washing drum 81 is provided with supply pipes 1, 2, 3 and 4, for the supply of hot and/or cold water, soap, soda and blue, respectively, and with an outlet 87. Associated with the drum 81 are measuring chambers 91 and 92 and a measurement or gauge chamber 80. The chamber 80 is hydraulically connected to the washing drum by a pipe 82 so that it acts in respect thereto as a limb of a U-tube, the rise in level in the chamber corresponding with the rise in level in the drum, and this chamber is of a height adapted to correspond with or accommodate water according to the maximum depth of dip required. The measuring chamber 91 is adapted to receive soap or soda and the measuring chamber 92 is adapted to receive blue prior to the discharge of these liquids to the washing drum.

Means is provided in association with each chamber 80, 91, 92 which is responsive to the quantity of liquid within the chamber for automatically measuring quantities of liquids to be delivered to the washing drum 81 and the quantities of liquids can be predetermined by selectable means which acts in conjunction with the quantity responsive means as hereinafter described.

Each chamber 80, 91, 92 is provided with a float and the spindles of these floats are provided with switches each adapted to control the circuit of a motorized valve associated with one of the supply pipes 1, 2, 3 or 4, or the outlet 87 to effect one operation of a valve while a second operation of each valve is adapted to be determined by a master switch denoted generally by reference 86. As shown in Fig. 1 the motorized valves associated with the supply pipes 1, 2, 3 and 4, are given the references 85, 88, 89 and 90, respectively, while the outlet 87 is controlled by motorized valve 145.

The chamber 80 is provided with a float, the spindle 83 of which carries, at its end which is located exteriorly of the chamber, a switch 84. This switch is rendered self-opening by means of a spring 14 (Figs. 2 and 3) and is adapted to be closed by contact with one or other of a series of pivoted stops or trigger devices 15, 16, 17, which may be protruded into the path of the switch or its actuating gear as the float in the measuring chamber rises. The spindle is also provided with a balanced pawl device 18 for the purpose of restoring the stop 15, 16 or 17 which has actuated the switch 84 on the spindle to its normal position upon descent of the float.

Figure 2:
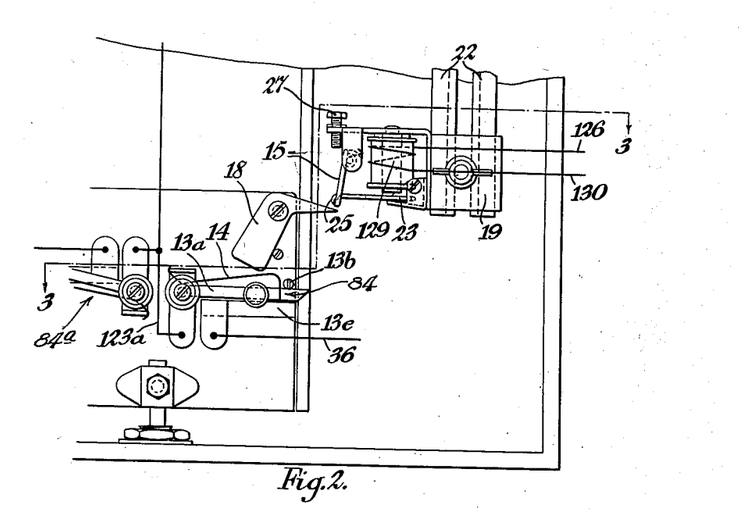
Figure 2 is an elevational view of part of the electromagnetic apparatus shown in Figure 1 on an enlarged scale.
Figure 3:
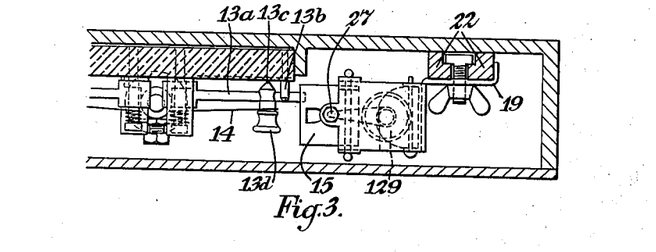
Figure 3 is a sectional plan view taken on the line 3—3 of Figure 2, the stop or trigger device being shown in released position.

A series of electromagnets 129, 128, 127 are mounted on attachments 19, 20, 21 adapted for sliding in guides 22 (to facilitate adjustment for height and interval) adjacent the float spindle and these electromagnets are provided with pivoted armatures 23, which have detents 25 at their free ends. These detents serve, when the electromagnets are de-energized, to retain the stops or trigger devices 15, 16 or 17 out of the path of the switch 84 and pawl 18, but when an electromagnet is energized its armature and detent is raised, thus releasing its associated stop or trigger device, and the latter urged by resilient means (not shown) to rotate about its pivot into a position extending across the path of movement of the switch 84 and pawl 18. The position taken up by the stop or trigger device 15, 16 or 17 may be controlled by means of an adjustable stop 27 (Fig. 2). The positions of the armature stops or trigger devices 15, 16, 17 correspond in height and interval with those of the levels in the washing drum 81 which represent the various depths of dips required or which represent the various predetermined measurable quantities of water required. Although three electromagnets and stops or trigger devices are shown this number may be varied according to the maximum number of depths of dips required. The electromagnets 129, 128 and 127, are connected to selectable means, hereinafter described, which correspond with the quantity denomination of the liquid to be delivered to the washing drum and according to the corresponding levels of liquid in the chamber 80 and which acts in co-operation with the master switch as hereinafter described.

The restoration of any projected stop or trigger device 15, 16 or 17 is effected by the balanced pawl 18 carried by the spindle 83 in the following manner. This pawl slides over a projected stop as the float spindle ascends but when the float spindle descends the pawl presses upon the projected stop and rotates it about its pivot, pushing it out of the way, until it is re-engaged by its detent 25. The switch 84 which is carried by the float spindle and which may be of the spring contact variety is electrically coupled in the circuit by means of a floating lead 123a and floating lead 36.

Preferably, adjustment facilities are provided on the float switch 84. As shown particularly in Figs. 2 and 3, this switch comprises a pivoted arm 13a which is engaged by the spring 14 to normally retain it in open position against a stop 13b. The bar 13a has slidably mounted thereon a contact 13c which is adapted to cooperate with a fixed contact strip 13e. The slidable contact 13c may be clamped in any desired position along the bar 13a by tightening a nut 13d. It will be appreciated that the time of closing the switch and hence the height of liquid in the chamber 80 can be predetermined within small limits by a suitable choice of the setting of the contact 13c.

The measuring devices 91 and 92 are similarly provided with electromagnets and stops or trigger devices, as previously described, spaced to correspond with the predetermined quantities of soap, soda and blue, it is desired to deliver to the washing drum 81 and adapted to co-operate with similar float switches.

Figure 5:
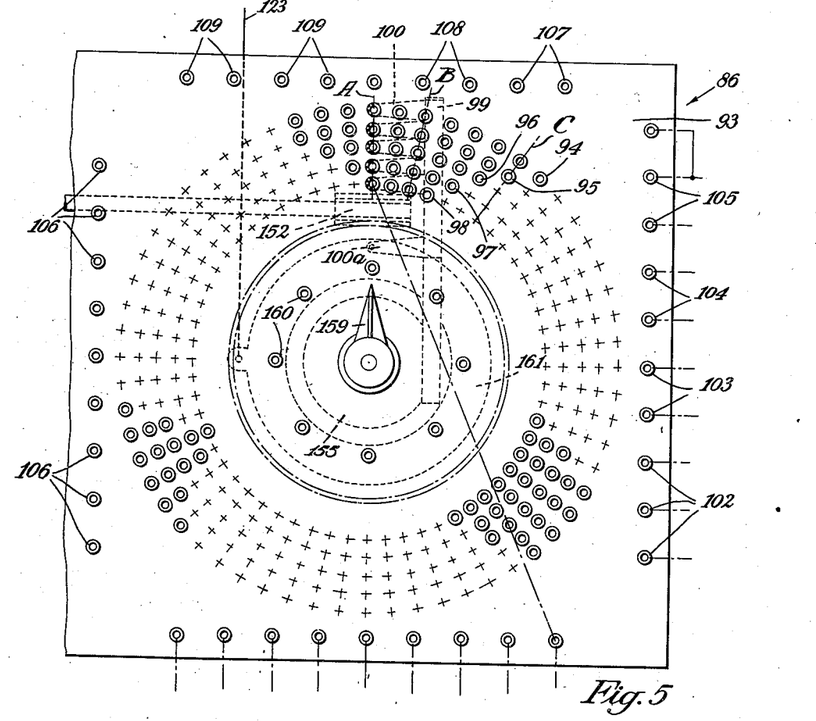
Figure 5 is a view of the master switch shown in Figure 1 but on a larger scale.
Figures 6, 7:
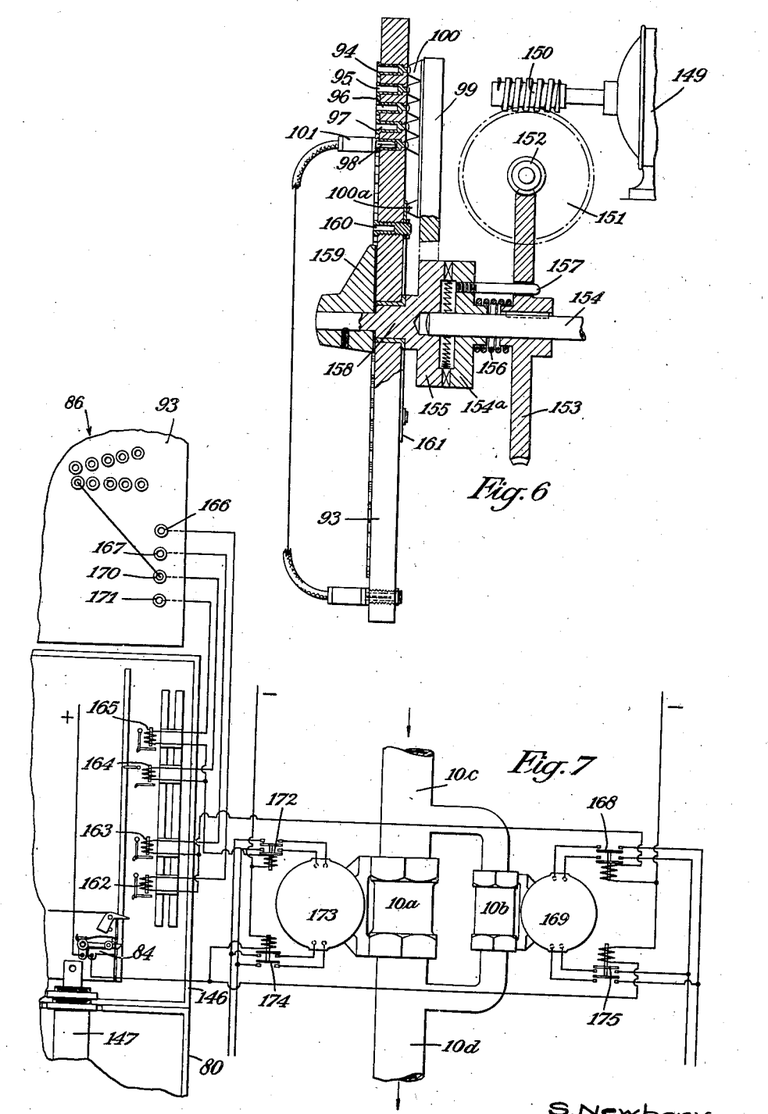
Figure 6 is a part end elevation and part cross section of the master switch according to Figure 5.
Figure 7 is a modification of part of the apparatus shown in Figure 1.

In the preferred form the master switch 86 which is shown more in detail in Figs. 5 and 6, comprises a dial 93 having a concentric series of 94, 95, 96, 97, 98 of sets of plug-in sockets. Each set is shown having its sockets disposed at one-minute intervals, that is to say, there are sixty sockets in each circle. The switch device is provided with a contact-making arm or sweep 99 operating behind the dial and carrying a number of wipers 100 corresponding with the number of sets of sockets. These wipers or spring contacts 100 are adapted to engage the backs of the sockets 94—98 and to establish circuits through any one or more of a series of jacks 101 which may be plugged-in to the sockets. The plurality of concentric rows of sockets 94 to 98 are provided so that a plurality of operations may be effected at the same time. In this respect it will be appreciated that if, for example, three operations are to be performed at the same time the three jacks corresponding to these three operations will be plugged into any three sockets on the same radial line on the dial 93 whereby the contact arm 99 during its rotary movement will, through its wipers or spring contacts 100, simultaneously establish circuits through the three jacks.

In conjunction with the switch selectable means comprising a plurality of sets of jacks 101 are employed corresponding with the number of operations to be controlled and with the various quantities associated therewith. For example, in the present instance there is a set 102 for water, set 103 for soap, set 104 for soda and set 105 for blue; another set 106 is provided in association with the outlet 87 from the drum and further sets 107, 108 for stopping and starting the rotation of the drum and one (109) for steam treatment if desired. The jacks 105 for blue are connected to the stop-actuating electromagnets 110, 111 in the quantity measuring device 92 by leads 112, 113. The jacks 103 for soap are connected to electromagnets 114, 115 in the quantity measuring device 91 by leads 116, 117, and the jacks 104 for soda are connected to electromagnets 118, 119 in the quantity measuring device 91 by leads 120, 121. The set of outlet valve jacks 106 corresponds with the number of maximum outlets required during a washing cycle and are connected to electromagnets 142, 143 and 144 of stop or trigger devices arranged in inverted position with respect to the devices 15, 16, 17 and adapted to co-operate with a further switch 84a and pawl 18a carried by the float spindle 83. This switch and pawl are similar in construction to switch 84 and pawl 18 but are inverted relatively thereto so that switch 84a is closed by a projected stop upon descent of the float spindle and a projected stop is restored to normal position by pawl 18a upon ascent of the float spindle. The water set of jacks 102 corresponds with a maximum number of inlets or dips of hot and/or cold water required and are connected to the stop actuating electromagnets 129, 128 and 127.

When any of the jacks 101 are not in use they may be conveniently placed in homes or dummy holes.

The plugging-in to the master switch of any jack 102 to 106 determines one operation of the motorized valve 85, 88, 89, 90 or 145, associated with the particular jack, a second operation of the valve being effected by closure of the float controlled switch thereof. For example, when the arm 99 passes onto one of the sockets 94—98 connected by a plug to one of the "water" sockets 102 a circuit will be completed as follows:— supply main 122, lead 123, switch arm 99, contact 100, socket 94—98, via plug connection (not shown) to the selected socket of the set 102, lead 124 or 125 or 126, electromagnet 127 or 128 or 129, common lead 130, relay 131, lead 132, to supply main 133. Electromagnet 127 or 128 or 129 and relay 131 are energized, the former attracting its armature 23, thus releasing its associated stop or trigger 17, 16 or 15 in the manner previously described and the latter closing its contacts 134, 135 to complete a circuit for the motor 136 of the valve 85 as follows:—supply main 137, closed contacts 134, lead 138, motor 136, lead 139, closed contacts 135, to supply main 140. The motor rotates the valve into position to connect the water supply to the washing machine 81 through pipe 1 and when the valve reaches fully open position an internal switch, hereinafter described with reference to Fig. 4, in the motor opens the circuit stopping the motor.

The circuits of the electromagnet 127, or 128 or 129 and relay 131 are opened by the contact 100 on arm 99 passing off the particular stud of the series 94—98.

As water is delivered into the washing machine cylinder part of it flows therefrom through connecting pipe 82 into the chamber 80 in order to maintain the water levels in both the washing machine 81 and in the chamber 80 the same, and the float carrying the spindle 83 rises lifting the switch 84. When the quantity of water in the chamber 80 is such that the switch 84 reaches the released stop 17, 16, 15 of the electromagnet 127, 128, 129 which was energized the switch is closed, completing a circuit to shut off the valve 85 as follows:—supply main 122, lead 123, floating lead 123a, closed switch 84, lead 36, relay 59, lead 132 to supply main 133. Relay 59 is thus energized and closes its contacts 60, 61 thereby closing another circuit of the motor 136 which then rotates the valve 85 to closed position, viz. supply main 140, closed contacts 60, lead 62, motor 136, lead 63, closed contacts 61 to supply main 137. When the valve 85 reaches closed position the internal circuit breaker switch of motor 136 opens the circuit, thus stopping the motor.

Figure 4:
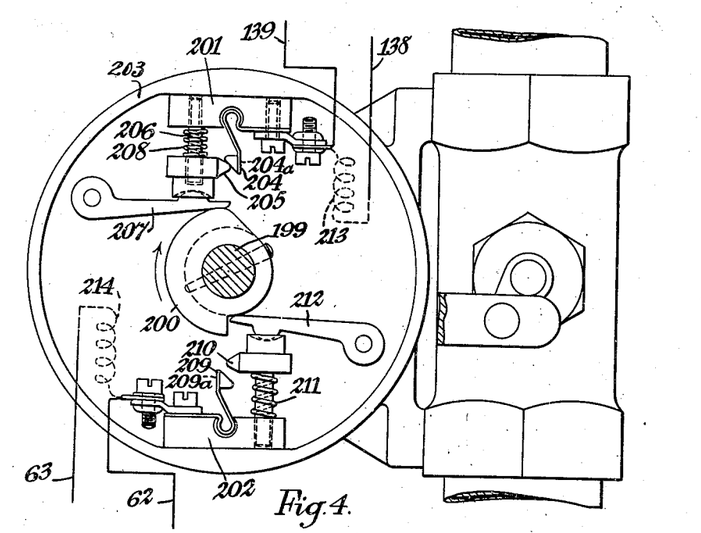
Figure 4 is a view showing an internal circuit breaker of a valve motor.

A form of internal circuit breaker switch of the motorized valve is illustrated in Fig. 4 and comprises contacts operated by a cam 200 on the motor shaft 199 which is geared to the disc to which the valve operating arm is pivoted. As shown in Fig. 4 two insulated blocks 201, 202 are mounted in the casing 203. The upper block 201, carries two contact members 204 and 204a located one behind the other in the position shown and adapted to be electrically connected by a bridge contact member 205 slidably mounted on a pin 206 secured to the block 201. An insulated portion of the bridge contact 205 is seated on an arm 207 pivotally secured to the casing 203 and a spring 208 between the block 201 and bridge contact 205 acts to urge the contact inwardly and maintain the arm 207 in engagement with the cam 200. Similar contacts 209 and 209a and bridge contact 210 are associated with the block 202, the bridge contact 210 being acted upon by a similar spring 211 to maintain a second pivoted arm 212 in engagement with the cam 200. The contact 204 is connected to the lead 139 previously referred to, and contact 204a is connected to lead 138 through one motor winding 213 shown in dotted lines, contact 209 is connected to lead 62 previously referred to, while contact 209a is connected to wire 63 through a second motor winding 214 shown in dotted lines. In the position shown the contacts 204, 204a are bridged by contact member 205 so that upon the circuit 138, 139 being energized as previously described, current will flow through motor winding 213, thus rotating the motor shaft 199 and cam 200 through one half of a revolution to move the valve to open position, at which time the motor will be stopped by breaking of the contacts 204, 204a by the bridge contact 205 due to the dropping of the pivoted arm behind the stepped portion of the cam 200. At the same time the contacts 209 and 209a will be bridged by bridge contact member 210 due to movement of the arm 212, under the influence of the raised portion of the cam 200 so that when the circuit 63, 62 is subsequently energized by closure of the float switch 84 as previously described, the motor winding 214 will be energized to again operate the motor to rotate the valve to closed position. Upon the valve reaching closed position the contacts 209, 209a will be broken by movement of the bridge contact 210 under the influence of the cam 200 and the contacts 204, 204a will again be engaged by bridge contact 205 so that the parts are again in the position ready for another operation of the valve.

With this apparatus in which the measurement or gauge chamber 80 is hydraulically connected to the washing drum 81, the selectable means comprising the jacks 102 predetermines the quantities of water to be delivered to the washing drum, the water is dispensed to the washing drum at times predetermined by the master switch and the desired quantities of water are automatically measured by the float spindle switch 84 rising in response to the quantity of water received into the chamber 80 from the washing drum and acting in conjunction with the protruded stop or trigger devices corresponding to the selected jacks 102.

The measurement and delivery of preselected quantities of soap and soda solutions by the measuring chamber 91 at times under control of the master switch 86 takes place in a similar manner to that described for the measurement and delivery of water except that the valve 88 or 89 is rotated to connect the soap or soda supply to the measuring chamber 91 when the arm 99 of the master switch passes onto one of the sockets 94 to 98 connected by a plug to one of the soap or soda sockets 103 or 104, and the valve 88 or 89 is rotated to connect the measuring chamber 91 to the washing drum 81 upon the float switch 64 or 65 being closed by contact with a projected stop which has been released by operation of one of the electromagnets 114, 115 or 118, 119. Thus the master switch controls the time of filling of the measuring chamber 91 with soap or soda, the quantity of soap or soda is automatically measured by the float switch 64, 65 being closed by engagement with a projected stop or trigger device corresponding to the quantity selected and in response to the quantity of soap or soda in the chamber 91, and such closure of switch 64, 65 effects movement of valve 88 or 89 to discharge the measured quantity of soap or soda to the washing drum.

A slight modification is made in the manner of dispensing "blue" by the chamber 92.

In this instance the chamber is periodically filled, say once a day, by means of the hand-operated valve 141, and measured quantities of "blue" are delivered to the washing machine by the valve 90 under control of electromagnet 110 or 111 at periods of time determined by the preselection on the master switch 86. In this case the arrangement of stops and trigger devices associated with the electromagnets 110, 111 and the float switch 66 is inverted so that when the arm 99 of the master switch 86 passes onto one of the sockets 94 to 98 connected by a plug to one of the "blue" sockets 105 and consequently the stop associated with one of the electromagnets 110 or 111 is protruded and the valve 90 rotated to place the measuring chamber 92 in communication with the washing drum, the float descends carrying with it the spindle switch 66 which is closed by its descent upon the protruded stop and hence the valve is rotated to cut off communication between the chamber 92 and the washing drum in a manner which will be readily apparent from the previous description.

Thus with this apparatus in which measured quantities of liquids, such as soap, soda and blue, are dispensed to the washing drum, the selectable means comprising the jacks 103, 104, 105 are for predetermining the desired quantities of liquids to be delivered and also for predetermining the sequence of delivery of such liquids, the float switches 64, 65, 66 which move in response to the quantity of liquids in the measuring chambers 91, 92 operate in conjunction with the stop or trigger devices corresponding with the selected jacks 102, 103, 104 automatically to measure the desired quantities of liquids which are dispensed to the washing drum, in the sequence predetermined by plugging-in of the jacks, at times predetermined by the master switch 86.

The outlet 87 of the washing machine is controlled by motorized valve 145 which, in turn, is controlled by the preselection on the master switch 86 and by electromagnets 142, 143, 144 and float switch 84a through relays 59b and 131b in a manner which will be readily apparent from the previous description.

It will be appreciated that restoration to normal position of any projected stop or trigger device associated with electromagnets 114, 115, 118, 119 or 127 to 129, is effected upon descent of the co-operating float spindle while restoration of any stop associated with electromagnets 110, 111 or 142 to 144 is effected upon ascent of the co-operating float spindle.

The float switch 84 and electromagnets 127—129 and 142 to 144 with associated parts are enclosed within an electrical control box 146 and this box is sealed from the ingress of steam or vapour from the measuring chamber 80 by a well of sealing liquid which is suspended from the control box and in which operates a cylinder associated with the float. As shown the float spindle 83 is surrounded by an annular vessel 147 the upper end of which is secured to the bottom of the box 146. A tube or cylinder 148 is attached to the spindle 83 at its upper end and extends into the interior of the vessel 147. The tube 147 is filled with suitable sealing liquid, such as mercury, for example. The electrical devices associated with the measuring devices 91, 92 are similarly enclosed within control boxes 146a, 146b which are sealed from the measuring chambers by similar sealing means associated with the floats.

The contact arm 99 of the master switch is shown for convenience in Fig. 6 as driven through suitable gearing from a motor 149. A worm 150 on the motor shaft meshes with a worm wheel 151 which carries a gear 152 in mesh with a larger gear 153. The gear 153 is splined to a shaft 154 which bears in elements 154a and 155 of a ratchet coupling normally held in engagement by a spring 156, the arm 99 being secured to the element 155 while the element 154a is adapted to be driven by gear 153 through the medium of a driving pin or pins 157. The element 155 of the ratchet coupling is secured to or formed integral with a stub shaft 158 which bears in the dial 93 and has secured on its end which projects from the front of the dial an indicating arm or pointer 159.

The indicating arm 159 gives a visible indication at any time of the operation which is taking place in the machine and also in conjunction with the ratchet coupling device affords a manually operable means for uncoupling the contact arm from the driving means and thus permitting manual adjustment or alteration in the position of the arm to in turn adjust or alter the timing of any operations of the machine.

The above described feature is particularly advantageous in a plant comprising a plurality of machines each having a controlling master switch. In such a plant the master switches may be coupled together and the contact arms thereof driven conjointly. With this arrangement the contact arms may be separately disconnected from the common driving mechanism and manually rotated through the ratchet coupling device into any desired position with respect to the other contact arm or arms, thereby affording a convenient means for producing any desired change of phase between the contact arms. Furthermore, if the time of any complete cycle of operations of the machine falls short of that provided for in a complete revolution of the contact arm, the remaining movement of the arm may be completed manually.

The angular velocity of the contact arm and, therefore, the time within which the various operations take place is, of course, determined by the speed of the driving mechanism, hence the angular velocity of the arm can be varied, for example, by suitably changing the gear ratio of the driving means.

It is desirable, for example, when the apparatus requires adjustment, when breakdowns occur, or in other circumstances, that the various operations of the machine can be obtained at any time by a manual operation independently of the driving means. For this purpose a plurality of plug-in sockets 160 (Figs. 5 and 6) are provided in the dial 93 each socket engaging a common annular contact element 161 which is at all times in contact with the arm 99 through the medium of a wiper 100a and is connected by the lead 123 to the supply main 122. It will be apparent that immediately a jack is inserted in any one of these sockets the particular operation corresponding to the jack selected is carried out. In this way it is possible at any time during the working of the machine to interpose a particular operation or operations in the normal cycle of operations.

The wipers or contacts 100 of the contact arm 99 are shown in Fig. 5 in contact with the radial line of sockets A. Assuming that this is the starting position of the arm and that the latter is driven at the rate of one revolution per hour, the operations, for example, to effect delivery to the washing drum of water to the second depth as determined by the stop 16 of the electromagnet 128 after the arm 99 has been driven for two minutes, followed after a further period of four minutes by delivery of the greater of the two quantities of soap as determined by the stop 114a of the electromagnet 114, are as follows:—

The middle one of the three jacks 102 for water which is connected to the lead 125 is inserted in any one of the sockets on the radial line B (Fig. 5) and the upper one of the two jacks 103 for soap which is connected to the lead 116 is inserted in any one of the sockets on the radial line C. The motor 149 is then started and through gearing 150 to 153, shaft 154, and ratchet coupling elements 154a and 155, effects rotation of the contact arm 99 and also the pointer 159. After the arm 99 has been driven for two minutes the wipers or contacts 100 engage the sockets on the radial line B whereby a circuit is established through the jack 102, which has been inserted in one of these sockets, as follows:—supply main 122, lead 123, annular contact element 161, wiper 100a, contact arm 99, wiper 100, the socket on the radial line B, the jack 102 in such socket, lead 125, electromagnet 128, common lead 130, relay 131 and lead 132 to supply main 133. Thus the electromagnet 128 is energized and releases its stop 16 and the relay 131 is also energized whereby the circuit for the valve motor 136 is completed and this motor rotates the valve 85 to open position as previously described. The circuit of the valve motor 136 is opened by the internal switch (Fig. 4) upon the valve 85 reaching fully open position and the circuit of the electromagnet 128 is opened by the wiper or contact 100 of arm 99 in the socket on the radial line B. Water is now delivered through the open valve 85 and conduit 1 into the washing drum and part of it flows therefrom into the chamber 80 thereby raising the float with its spindle 83 and switch 84 and when the latter engages the protruded stop 16 it is closed and thereby energizes the relay 59 to close a second circuit of valve motor 136 and effect rotation of valve 85 into closed position also as previously described. The quantity of water as determined by the position of stop 16 has now been delivered to the washing drum and four minutes later, or six minutes after commencement of operation of the master switch, the contacts or wipers 100 of contact arm 99 move into contact with the sockets on the radial line C into one of which the jack 103 has been inserted. A circuit is now established as follows:—main supply 122, lead 123, annular contact element 161, wiper 100a, contact arm 99, wiper 100, the socket on the radial line C, the jack 103 in such socket, lead 116, electromagnet 114, relay 131a, and lead 132a to supply main 133. Thus the electromagnet 114 and the relay 131a are energized, the former releasing its stop 114a and the latter effecting closure of the circuit of the motor of valve 88 which rotates the valve into position to connect the source of soap supply with the measuring chamber 91. As soap is delivered to the chamber 91 the float in the latter rises carrying the switch 64 upwardly and this switch upon engaging the protruded stop 114a is closed thereby energizing the relay 59a which effects closure of the second circuit of the motor of valve 88 so that this valve is rotated to connect the measuring chamber 91 to the conduit 2 and the measured quantity of soap in chamber 91 is thereupon delivered to the washing drum.

It will be appreciated that where low "dips" of liquid such as water, for example, are required in the washing machine, difficulty may be encountered in opening and closing a large valve in the comparatively short period of time taken to pass only the required small amount of liquid. On the other hand, it is desirable to employ a large valve for high "dips" so that the inlet times shall not be unduly prolonged.

The difficulty referred to may be obviated by the modified arrangement shown in Fig. 7 in which the parts corresponding to those of Fig. 1 are indicated by similar reference numerals. According to this modification two motorized valves are employed, that is, a large valve 10a for the high "dips" and a smaller valve 10b for the low "dips", these valves being arranged in parallel and connected to a common inlet 10c and outlet 10d. As illustrated four stop or trigger devices are provided having electromagnets 162, 163, 164 and 165 respectively. The electromagnets 162 and 163 are suitably wired to "low dip" sockets 166 and 167, respectively, and to a relay 168 the contacts of which are adapted to control the circuit to a pulling motor 169 for opening the "low dip" valve 10b. Similarly, the electromagnets 164 and 165 are suitably wired to "high dip" sockets 170 and 171, respectively, and to a relay 172 the contacts of which are adapted to control the circuit to a pulling motor 173 for opening the "high dip" valve 10a. The closure of either valve 10a or 10b by its respective motor 173 or 169 is effected by operation of relay 174 or 175 upon closure of the float switch 84. The operation of this modified arrangement will be readily apparent from the previous description, the difference between the modification and the arrangement shown, for example, in Fig. 1, being that instead of a single large valve being operated for both high and low "dips" a small valve is operated for low "dips" while for high "dips" the larger valve is utilized.

Figure 8:
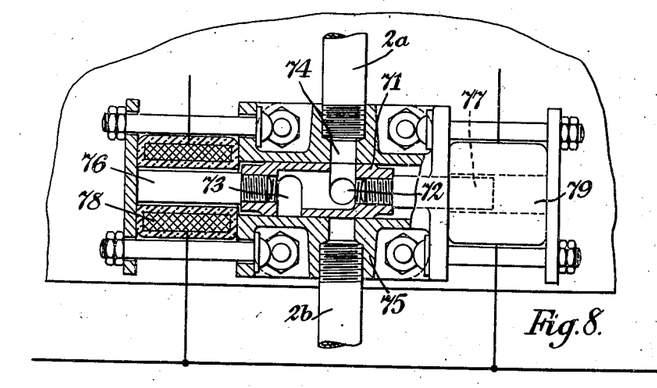
Figures 8 and 9 are views, partly in cross section, of an alternative form of electrically controlled valve.
Figure 9:
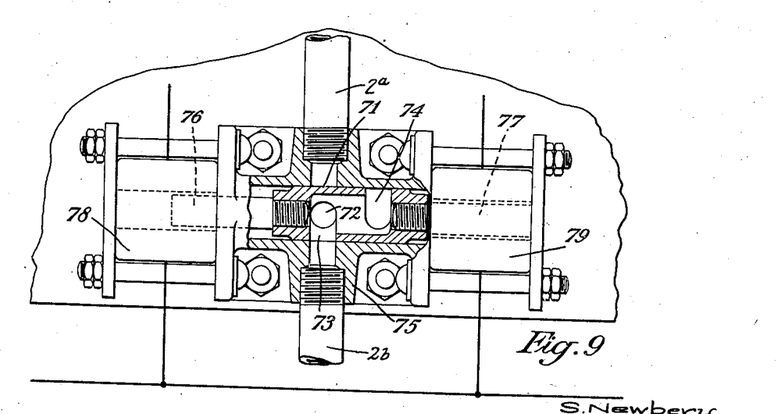

Instead of providing a rotary control valve a reciprocating control valve as shown in Figs. 8 and 9 may be employed. This valve is shown as a three-way valve and therefore is particularly suitable in substitution for the valves 88, 89 and 90. As shown this valve constitutes a hollow or cavitied body 71 having side openings or apertures 72, 73, 74 adapted to communicate with, for example, the chamber 91 and the outlet side 2b or inlet side 2a of pipe 2 according to the position of the body 71.

The valve is mounted in a casing 75 and has in extension of its axis in both directions core members 76, 77 which are adapted to be actuated by solenoids 78 and 79 respectively, the selective operation of one or other of which determining the movement and position of the valve. Fig. 8 shows the valve in the position it takes up when solenoid 78 is energized, and providing communication between the inlet side 2a and the chamber 91, whereas Fig. 9 shows the valve in the position it takes up when the solenoid 79 has been energized, and providing communication between the outlet side 2b and the chamber 91.

The apparatus as illustrated is intended for working at atmospheric pressure but it will be appreciated that providing the vent pipes, such as shown at 68 or 69 associated with the chambers 91 and 92 are dispensed with, such chambers may be adapted for operation at pressure above atmospheric. In this respect it is to be noted that in the sealing devices previously referred to associated with the floats in chambers 91, 92 the well of mercury or other suitable sealing liquid should be of sufficient length to provide that when the float is at its highest level the pressure acting on one column of sealing liquid is able to support the other column of sealing liquid at a height equivalent to the pressure inside the measuring chamber.

For working under pressure the pressure inside the tank may be built up by the rising within the measuring chamber of the liquid to be measured, thus compressing the air above. In this way a pressure discharge may be obtained.

According to the invention as applied, for example to a washing machine, it will be appreciated that the time or instant when any particular operation shall commence or cease is determined by plugging-in to the master switch socket corresponding with the time desired from any zero setting. By selecting the appropriate plug any measured quantity of liquid is simultaneously determined. According to this arrangement it will be appreciated that the cycle of operations may be changed according to any program the operator may desire. The timing of certain operations may be varied to determine the relative quantities of water admitted to the drum, for example, where a mixture of hot and cold water is desired the relative proportion in which the respective jacks are plugged in may determine, by the time spacing of the plugged sockets, the opening and shutting of the valves concerned while the final quantity or depth of "dip" of the mixture is decided by the float actuation of the spindle switch of the float chamber.

Having now described my invention what I claim as new and desire to secure by Letters Patent is:—

1. Apparatus of the class described comprising in combination, a vessel, a liquid supply conduit communicating with the vessel, a valve in said conduit, a motor for operating said valve, a measurement chamber located laterally of the vessel, a pipe connecting the lower portion of said measurement chamber with the lower portion of said vessel so that the vessel and chamber form the legs of a U-tube, a float in said measurement chamber, a master switch, an electrical circuit for said valve motor controlled by said master switch for operating said valve motor to move the valve to open position and effect delivery of liquid through said conduit to said vessel, a plurality of protrudable devices spaced to correspond with predetermined quantities of liquid to be measured, a switch carried by said float, means under the control of the master switch for selectively protruding any one of said devices into the path of said float switch, and a second circuit of said valve motor controlled by said float switch and closed upon closure of said float switch by engagement thereof with a protruded device for operating said valve motor to move the valve to closed position and terminate delivery of liquid to said vessel.

2. Apparatus of the class described comprising in combination, a vessel, a liquid supply conduit communicating with the vessel, a motorized valve in said conduit, a measurement chamber located laterally of the vessel, a communicating pipe between the lower portion of said measurement chamber and the lower portion of the vessel so that the vessel and chamber form the legs of a U-tube, a float in said measurement chamber, a master switch for controlling the opening of said motorized valve to effect delivery of liquid through said conduit to said vessel and chamber, a plurality of protrudable stop devices spaced to correspond with predetermined quantities of liquid to be measured, a switch carried by said float, selectable means under control of said master switch for protruding any one of said stop devices corresponding with the selected quantity into the path of said float switch, and means operated upon the closure of said float switch by engagement with a protruded device for closing said motorized valve and terminating delivery of liquid to said vessel.

3. Apparatus of the class described comprising in combination, a vessel, a liquid supply conduit communicating with the vessel, a valve in said conduit, a measurement chamber located laterally of the vessel, a communicating pipe between the bottom of said chamber and the bottom of the vessel so that the vessel and chamber form the legs of a U-tube, a float in said measurement chamber, a master switch controlling the opening of said valve to effect delivery of liquid through said conduit to said vessel and chamber, a series of pivoted stop devices arranged at heights corresponding with predetermined quantities of liquid to be measured, a switch carried by said float, electromagnetic means under control of the master switch for selectively protruding any one of said pivoted stop devices into the path of movement of the float switch, and means rendered operable upon closure of said float switch by engagement with a protruded stop device for closing said valve to terminate delivery to the vessel of a quantity of liquid corresponding with the stop device protruded.

4. Apparatus of the class described comprising, in combination, a vessel, a liquid supply conduit communicating with the vessel, a valve in said conduit, a motor for opening and closing said valve, a measurement chamber located laterally of the vessel, a pipe connecting the lower portion of said measurement chamber with the lower portion of the vessel so that the vessel and chamber form the legs of a U-tube, a float in said measurement chamber, a normally open switch carried by said float, a master switch for controlling the operation of said valve motor to open said valve and initiate delivery of liquid through said conduit to said vessel and chamber, a series of pivoted stops arranged at heights corresponding with predetermined quantities of liquid to be measured, a series of electromagnets one for each pivoted stop, means under control of the master switch for selectively energizing any one of said electromagnets to project the stop associated with the energized electromagnet into the path of movement of the float switch as the latter rises in response to liquid delivered to the said vessel and chamber, and means rendered operable upon closure of said float switch by engagement with the projected stop for controlling the operation of said valve motor to close said valve and terminate delivery to the vessel of a quantity of liquid corresponding with the protruded stop.

5. In combination with the apparatus according to claim 4, means carried by the said float for resetting a protruded stop.

6. Apparatus of the class described comprising in combination, a vessel, a liquid supply conduit communicating with the vessel, a valve in said conduit, a motor for opening and closing said valve, a measurement chamber located laterally of the vessel, a pipe connecting the lower portion of said measurement chamber, with the lower portion of said vessel so that the vessel and chamber form the legs of a U-tube, a float in said measurement chamber, a normally open switch carried by said float, a master switch for closing a first circuit to the motor of said valve at selected times to open said valve and initiate delivery of liquid to the said vessel and measurement chamber, a series of protrudable devices arranged at heights corresponding with predetermined measured quantities of liquid to be delivered to the vessel, means under control of the master switch for selectively protruding any one of said devices into the path of the float switch as the latter rises in response to the liquid delivered to the vessel, a second circuit of the said valve motor, and means operable upon closure of the float switch by engagement with a protruded device for closing said second circuit of the valve motor to close said valve and terminate delivery to said vessel of a quantity of liquid corresponding with the protruded device.

7. Apparatus of the class described comprising in combination, a vessel, a liquid supply conduit communicating with the vessel, a motorized supply valve in said supply conduit, a discharge conduit communicating with the vessel, a motorized discharge valve in the discharge conduit, a measurement chamber located laterally of the vessel, a pipe connecting the lower portion of said measurement chamber with the lower portion of the vessel so that the vessel and chamber form the legs of a U-tube, a float in said measurement chamber, a switch carried by said float, a master switch for closing circuits to said motorized supply and discharge valves at selected times for effecting opening of said supply and discharge valves, a series of protrudable devices arranged at heights corresponding with predetermined quantities of liquid to be delivered to the vessel, means under control of the master switch for selectively protruding any one of said series of protrudable devices into the path of the float switch as the latter rises, means operated upon closure of the float switch by contact with a protruded device to close the said motorized supply valve and terminate delivery to said vessel of a quantity of liquid corresponding with the protruded device selected, and means operated by said float, when the latter falls, for closing said motorized discharge valve.

8. Apparatus according to claim 7 wherein the means operated by the float for closing the motorized discharge valve, comprises a second switch carried by the float, a second series of protrudable devices arranged at heights corresponding with predetermined quantities of liquid to be discharged, means under control of the master switch for selectively protruding any one of said second series of protrudable devices into the downward path of said second float switch, and means rendered operable upon closure of said second float switch by contact with a protruded device of said second series of devices for moving said motorized discharge valve to closed position.

9. Apparatus of the class described, comprising in combination a vessel, a liquid supply conduit communicating with said vessel, a valve in said conduit, a measurement chamber located laterally of the vessel, a pipe connecting the lower portion of said measurement chamber with the lower portion of the vessel so that the vessel and chamber form the legs of a U-tube, a float in said measurement chamber, a member carried by said float, a master switch electrically controlling the opening of said valve at predetermined times for effecting delivery of liquid through said conduit into said vessel, a series of protrudable devices spaced to correspond with predetermined quantities of liquid to be measured, means under control of the master switch for selectively protruding any one of said series of protrudable devices into the path of said float member, means operated by the engagement of the said float member with a protruded device for closing said valve and terminating delivery of liquid through said conduit, a measuring chamber, a delivery pipe between said measuring chamber and said vessel, a valve in said delivery pipe, a float in said measuring chamber, means under control of the master switch for opening the valve in the said delivery pipe at predetermined times to effect delivery of liquid from said measuring chamber to the vessel, and means associated with the float in the measuring chamber for closing the valve in said delivery pipe when a predetermined quantity of liquid has been delivered from said measuring chamber.

10. Apparatus of the class described, comprising in combination, a vessel, a liquid supply conduit communicating with said vessel, a valve in said conduit, a measurement chamber located laterally of the vessel, a pipe connecting the lower portion of said measurement chamber with the lower portion of said vessel so that the vessel and chamber form the legs of a U-tube, a float in said measurement chamber, a member carried by said float, a master switch electrically controlling the opening of said valve at predetermined times for effecting delivery of liquid through said conduit to the vessel and measurement chamber, a series of protrudable devices arranged at heights corresponding with predetermined quantities of liquids to be delivered through said conduit to the vessel, means under control of the master switch for selectively protruding any one of said series of devices into the path of movement of said float member, means operated by the engagement of said float member with a protruded device of said series of devices for closing said valve and terminating delivery of liquid through said conduit, a measuring chamber, a second liquid supply conduit communicating with said measuring chamber and with said vessel, a valve in said second supply conduit for controlling communication between the second supply conduit and said measuring chamber and between said measuring chamber and said vessel, a float in said measuring chamber, means under control of the master switch for moving the valve in said second supply conduit at predetermined times into position to connect the second supply conduit with the measuring chamber to deliver liquid to said measuring chamber and means controlled by the float in the measuring chamber for moving the valve in the second supply conduit into position to cut off communication between said second liquid supply conduit and the measuring chamber and connect the latter to the vessel.

11. In combination with the apparatus according to claim 3, a measuring chamber in addition to said measurement chamber, a float in said measuring chamber, a switch carried by said float in said measuring chamber, a second series of protrudable stop devices arranged at heights corresponding with predetermined quantities of liquid to be delivered to said measuring chamber, a second liquid supply conduit communicating with said measuring chamber and with said vessel, a second valve located in said second liquid supply conduit, means controlled by the master switch for moving said second valve into position to connect the second liquid supply to said measuring chamber to effect delivery of liquid to said measuring chamber at predetermined times and for selectively protruding any one of said second series of protrudable stop devices into the path of the switch carried by the float in the measuring chamber, and means operated by engagement of the switch carried by the float in the measuring chamber with the protruded device of said second series for moving said second valve into position to cut off delivery of liquid to said measuring chamber and connect said measuring chamber to the said vessel.

12. In combination with the apparatus according to claim 3, a measuring chamber containing liquid, a float in said measuring chamber, a switch carried by the float in said measuring chamber, a second series of protrudable stop devices arranged at heights corresponding with predetermined quantities of liquid to be delivered from said measuring chamber, a valved conduit connecting said measuring chamber and the said vessel, means controlled by the master switch for opening the valve in said valved conduit at predetermined times to initiate delivery of liquid from said measuring chamber to said vessel and for selectively protruding any one of said second series of stop devices into the downward path of the switch carried by the float in the measuring chamber, and means operated by closure of the switch carried by the float in the measuring chamber by engagement with the protruded stop device of the second series for closing the valve in said valved conduit to terminate delivery from said measuring chamber to said vessel of the quantity of liquid corresponding with the protruded device.

13. In combination with the apparatus according to claim 3 a plurality of measuring chambers for various liquids in addition to said measurement chamber, a float in each of said measuring chambers, a plurality of valved conduits each connecting one of said measuring chambers to said vessel, means controlled by the master switch for opening the valves in said valved conduits at predetermined times to initiate the delivery of liquid from said measuring chambers to said vessel, selectable means at the master switch for predetermined quantities of liquid to be delivered from said measuring chambers and the sequence of delivery of said liquids to the vessel, and means associated with the floats of each measuring chamber and operating in conjunction with said selectable means for closing said valves to terminate liquid delivery operations.

14. Apparatus of the class described comprising in combination, a plurality of measuring chambers for various liquids, a common vessel for receiving predetermined quantities of such liquids from the measuring chambers, a float in each chamber, a switch carried by each float, a series of pivoted stop devices associated with each measuring chamber and arranged at heights corresponding with predetermined quantities of liquid to be delivered, conduits connecting the measuring chambers with the said vessel, a motorized valve in each of said conduits, a master switch for closing one circuit of said motorized valves at predetermined times to effect a first movement of each of said valves and for selectively protruding any one of each of said series of pivoted stop devices into the path of its associated float switch, and a second circuit of each of said valves energized upon closure of a float switch by engagement with a protruded stop device for effecting a second movement of each of said valves.

15. Apparatus of the class described comprising in combination, a plurality of measuring chambers for various liquids, a common vessel for receiving predetermined quantities of liquids from said measuring chambers at predetermined times, a measurement chamber located laterally of said common vessel, a communicating pipe between the lower portion of said measurement chamber and the lower portion of said common vessel so that the vessel and measurement chamber form the legs of a U-tube, conduits connecting said vessel with a source of liquid supply and with said measuring chambers, a motorized valve in each of said conduits, a float in each of said measuring and measurement chambers, a switch carried by each of said floats, a series of pivoted stop devices arranged above each of said measuring and measurement chambers at heights corresponding with predetermined quantities of liquid to be delivered, a master switch for automatically energizing one circuit of each of said motorized valves at predetermined times to effect a first movement of each of said valves, means controlled by the master switch for selectively protruding any one of each of said series of pivoted stop devices into the path of its associated float switch, and a second circuit of each of said motorized valves including one of said float switches energized by closure of said float switch upon engagement with a protruded stop device to effect a second movement of each of said valves.

16. In combination with apparatus according to claim 15, a discharge conduit connected to said common vessel, a motorized discharge valve in said discharge conduit, means controlled by the master switch for opening said discharge valve at predetermined times, and means controlled by the float in said measurement chamber for closing said discharge valve.

17. In apparatus of the class described, a vessel, a chamber located laterally of the vessel, a communicating pipe between the lower portion of the vessel and the lower portion of the chamber so that the vessel and chamber form the legs of a U-tube, a liquid supply conduit communicating with said vessel, a valve in said supply conduit, a motor for operating said valve, a master switch for closing a circuit of said motor to move the valve to open position and effect delivery of liquid to said vessel, a control box surmounting said chamber, a series of pivoted stops arranged in said control box at heights corresponding with predetermined quantities of liquid to be delivered to said vessel, a series of electromagnets in said control box one for each pivoted stop, a float in said chamber, a spindle carried by said float and projecting through the top of said chamber into said control box, a switch within the control box and carried by the float spindle, means under control of the master switch for selectively energizing any one of said electromagnets to project the stop associated with the energized electromagnet into the path of movement of the float switch as the float rises in response to liquid delivered to said vessel, a second circuit of said valve motor closed by closure of said float switch upon engagement thereof with the projected stop to effect movement of the valve to closed position, and liquid sealing means surrounding the portion of the float spindle within said chamber for preventing passage of vapour from said chamber into said control box.

18. Apparatus of the class described comprising in combination, a plurality of measuring chambers for various liquids, a common vessel for receiving predetermined quantities of liquids from said measuring chambers at predetermined times, a measurement chamber located laterally of said common vessel, a communicating pipe between the lower portion of said measurement chamber and the lower portion of said common vessel so that said common vessel and measurement chamber form the legs of a U-tube, conduits connecting said vessel with a source of liquid supply and with said measuring chambers, a motorized valve in each of said conduits, a float in each of said measuring and measurement chambers, a switch carried by each of said floats, a plurality of series of protrudable stop devices one series arranged above each of said measuring and measurement chambers at heights corresponding with predetermined quantities of liquid to be delivered, a plurality of series of electromagnets each electromagnet for operating one stop device to protrude the latter into the path of one of said float switches, a rotary control arm connected to a source of current supply, means for driving said arm at a predetermined time rate, a concentric series of sets of plug-in sockets corresponding in position with predetermined times and arranged in the path of said arm, a plurality of sets of jacks for selectively plugging into said sockets the number of jacks in a set corresponding with the number of electromagnets and stop devices in a series, electrical connections between said jacks and said electromagnets, and two electrical circuits for each of said motorized valves, one circuit including one series of said electromagnets and jacks and controlled by said rotary arm and the other circuit controlled by one of said float switches.

19. Apparatus of the class described comprising in combination a vessel, a liquid supply conduit communicating with said vessel, a pair of valves arranged in parallel in said conduit for passing large and small quantities of liquid respectively, means for selectively utilizing said valves in accordance with the quantity of liquid to be delivered through said conduit, a measurement chamber located laterally of said vessel, a communicating pipe between the lower portion of said measurement chamber and the lower portion of said vessel so that said vessel and chamber form the legs of a U-tube, a float in said measurement chamber, a master switch for controlling the opening of one or other of the said valves at predetermined times for delivering liquid through said conduit to said vessel, a plurality of protrudable devices spaced to correspond with predetermined quantities of liquid to be measured, a member carried by said float, means under control of the master switch for selectively protruding any one of said devices into the path of said float member, and means operated by engagement of the float member with a protruded device for closing the previously opened valve of said pair of valves to terminate delivery of liquid to said vessel.

STANLEY NEWBERY.